United States Patent
Li et al.

(10) Patent No.: US 12,309,421 B2
(45) Date of Patent: *May 20, 2025

(54) SIGNALING A MAXIMUM NUMBER OF MERGE MOTION VECTOR PREDICTION CANDIDATES FOR INTER PREDICTION

(71) Applicant: Tencent America LLC, Palo Alto, CA (US)

(72) Inventors: Ling Li, Seoul (KR); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/828,872

(22) Filed: May 31, 2022

(65) Prior Publication Data
US 2023/0164350 A1 May 25, 2023

Related U.S. Application Data

(63) Continuation of application No. 17/088,073, filed on Nov. 3, 2020, now Pat. No. 11,375,231.
(Continued)

(51) Int. Cl.
*H04N 19/56* (2014.01)
*H04N 19/176* (2014.01)
(Continued)

(52) U.S. Cl.
CPC .......... *H04N 19/56* (2014.11); *H04N 19/176* (2014.11); *H04N 19/184* (2014.11); *H04N 19/44* (2014.11); *H04N 19/70* (2014.11)

(58) Field of Classification Search
None
See application file for complete search history.

(56) References Cited

U.S. PATENT DOCUMENTS

| 10,362,330 B1 | 7/2019 | Li et al. |
| 2014/0211857 A1 | 7/2014 | Sugio et al. |

(Continued)

FOREIGN PATENT DOCUMENTS

| WO | 2013051209 A1 | 4/2013 |
| WO | 2015180014 A1 | 12/2015 |
| WO | 2020004990 A1 | 1/2020 |

OTHER PUBLICATIONS

Japanese Office Action issued Oct. 18, 2022 in Application No. 2021-557681 with English Translation, 17 pages.
(Continued)

*Primary Examiner* — Christopher Braniff
(74) *Attorney, Agent, or Firm* — ArentFox Schiff LLP

(57) ABSTRACT

A method for video encoding includes generating a first syntax element indicating a maximum number of merge motion vector prediction (MVP) candidates, and encoding the first syntax element at a first coding level in a coded video bitstream, the first coding level being higher than a picture parameter set (PPS) level. The video encoding method also includes transmitting the coded video bitstream including the first syntax element. The maximum number of merge MVP candidates indicated by the first syntax element is applicable for reconstructing coding blocks of the coded video bitstream associated with the first coding level.

18 Claims, 22 Drawing Sheets

Related U.S. Application Data

(60) Provisional application No. 62/960,930, filed on Jan. 14, 2020.

(51) Int. Cl.
  *H04N 19/184* (2014.01)
  *H04N 19/44* (2014.01)
  *H04N 19/70* (2014.01)

(56) References Cited

U.S. PATENT DOCUMENTS

| | | | |
|---|---|---|---|
| 2015/0078450 A1* | 3/2015 | Chen | H04N 19/577 375/240.16 |
| 2016/0105670 A1 | 4/2016 | Pang et al. | |
| 2017/0280159 A1 | 9/2017 | Xu et al. | |
| 2017/0289566 A1 | 10/2017 | He et al. | |
| 2019/0335200 A1 | 10/2019 | Xu et al. | |
| 2021/0006798 A1 | 1/2021 | Jang | |

OTHER PUBLICATIONS

Benjamin Bross, et al., "Versatile Video Coding (Draft 7)", Document: JVET-P2001-vE, [online], Joint Video Experts Team (JVET) of ITU-T SG 16 WP 3 and ISO/IEC JTC 1/SC 29/WG 11, Jan. 8, 2020, JVET-Q0508 (version 1) pp. 45-48 and 118.

Japanese Office Action issued Apr. 25, 2023 in Application No. 2021-557681 with English Translation, 18 pages.

Sadayasu Ono, et al., "Ubiquitous Technology High Efficiency Coding of Video—MPEG-4 and H.264-", 1st edition, Apr. 20, 2005, Ohmsha Co., Ltd., No. 106-108, pp. 126-127, ISBN: 4-274-20060-4.

Shintaro Ueda, et al., "Stream Authentication in NAL for H.264/AVC" IPSJ Symposium Series Multimedia Communication and Distributed Processing Workshop Proceedings, vol. 2006, No. 15, Nov. 29, 2006, Incorporated Association Information Processing Society of Japan, pp. 31-36, ISSN: 1344-0640.

Chun-Chia Chen, et al., "CE4.3.1: Shared merging candidate list", Document: JVET-M0170-v1, Joint Video Experts Team (JVET) of IT UT SG 16 WP 3 and ISO/IEC JTC 1/SC 29/WG 11, Jan. 2, 2019, pp. 1-13.

Singaporean Search Report and Written Opinion issued Apr. 17, 2023 in Application No. 11202111741S, 9 pages.

International Search Report issued Mar. 25, 2021 in Application No. PCT/US21/13051, 3 pages.

Written Opinion issued Mar. 25, 2021 in Application No. PCT/US21/13051, 10 pages.

Supplementary European Search Report mailed Feb. 2, 2024 in Application No. 21740870.7, 9 pages.

Benjamin Bross et al: "Versatile Video Coding (Draft 7)", 16. JVET Meeting; Oct. 1, 2019-Oct. 11, 2019; Geneva; (The Joint Video Exploration Team of ISO/IEC JTC1/SC29/WG11 and ITU-T SG. 16) No. JVET-P2001-vE; Nov. 14, 2019, pp. 1-488.

Lil et al: "SPS level control over the number of merge candidates", 17. JVET Meeting; Jan. 7, 2020-Jan. 17, 2020; Brussels; (The Joint Video Exploration Team of ISO/IEC JTC1/SC29/WG11 and ITU-T SG. 16), No. JVET-Q0798; Jan. 15, 2020, pp. 1-4.

* cited by examiner

| pic_parameter_set_rbsp( ) { | Descriptor |
|---|---|
| ... | |
| constant_slice_header_params_enabled_flag | u(1) |
| if( constant_slice_header_params_enabled_flag ) { | |
| ... | |
| pps_six_minus_max_num_merge_cand_plus1 | ue(v) |
| ... | |
| } | |
| ... | |
| } | |

FIG. 9

| picture_header_rbsp( ) { | Descriptor |
|---|---|
| ... | |
| if( !pps_six_minus_max_num_merge_cand_plus1 ) | |
|   pic_six_minus_max_num_merge_cand | ue(v) |
| ... | |
| } | |

FIG. 10

| | Descriptor |
|---|---|
| seq_parameter_set_rbsp( ) { | |
| ... | |
| sps_geo_enabled_flag | u(1) |
| ... | |
| } | |

FIG. 11

| | Descriptor |
|---|---|
| pic_parameter_set_rbsp( ) { | |
| ... | |
| constant_slice_header_params_enabled_flag | u(1) |
| if( constant_slice_header_params_enabled_flag ) { | |
| ... | |
| pps_max_num_merge_cand_minus_max_num_geo_cand_plus1 | ue(v) |
| } | |
| ... | |
| } | |

FIG. 12

| | Descriptor |
|---|---|
| picture_header_rbspt( ) { | |
| ... | |
| if( sps_triangle_enabled_flag && MaxNumMergeCand >= 2 && !pps_max_num_merge_cand_minus_max_num_geo_cand_plus1 ) | |
|   pic_max_num_merge_cand_minus_max_num_geo_cand | ue(v) |
| ... | |
| } | |

FIG. 13

| | Descriptor |
|---|---|
| picture_header_rbsp( ) { | |
| ... | |
| if( sps_affine_enabled_flag ) | |
| pic_five_minus_max_num_subblock_merge_cand | ue(v) |
| ... | |
| } | |

FIG. 14

| picture_header_rbsp( ) { | Descriptor |
|---|---|
| ... | |
| if( sps_ibc_enabled_flag ) | |
|   pic_six_minus_max_num_ibc_merge_cand | ue(v) |
| ... | |
| } | |

FIG. 15

| seq_parameter_set_rbsp( ) { | Descriptor |
|---|---|
| six_minus_max_num_merge_cand | ue(v) |
| ... | |
| five_minus_max_num_subblock_merge_cand | ue(v) |
| ... | |
| six_minus_max_num_ibc_merge_cand | ue(v) |
| ... | |
| max_num_merge_cand_minus_max_num_geo_cand | ue(v) |
| ... | |
| } | |

FIG. 16

| | Descriptor |
|---|---|
| seq_parameter_set_rbsp() { | |
|   six_minus_max_num_merge_cand | ue(v) |
|   ... | |
|   sps_affine_enabled_flag | u(1) |
|   if( sps_affine_enabled_flag ) { | |
|     five_minus_max_num_subblock_merge_cand | ue(v) |
|     ... | |
|   } | |
|   ... | |
|   sps_ibc_enabled_flag | u(1) |
|   if( sps_ibc_enabled_flag ) | |
|     six_minus_max_num_ibc_merge_cand | ue(v) |
|   ... | |
|   sps_geo_enabled_flag | u(1) |
|   if ( sps_geo_enabled_flag && MaxNumMergeCand >= 3 ) | |
|     max_num_merge_cand_minus_max_num_geo_cand | ue(v) |
|   ... | |
| } | |

1710 → sps_affine_enabled_flag block
1711 → sps_ibc_enabled_flag block
1712 → sps_geo_enabled_flag block

FIG. 17

| seq_parameter_set_rbsp( ) { | Descriptor |
|---|---|
| six_minus_max_num_merge_cand | ue(v) |
| ... | |
| sps_ibc_enabled_flag | u(1) |
| if( sps_ibc_enabled_flag ) | |
| six_minus_max_num_ibc_merge_cand | ue(v) |
| ... | |
| sps_geo_enabled_flag | u(1) |
| if( sps_geo_enabled_flag && MaxNumMergeCand >= 3 ) | |
| max_num_merge_cand_minus_max_num_geo_cand | ue(v) |
| ... | |
| } | |

*FIG. 18A*

| picture_header_rbsp( ) { | Descriptor |
|---|---|
| ... | |
| if( sps_affine_enabled_flag ) { | |
| five_minus_max_num_subblock_merge_cand | ue(v) |
| ... | |
| } | |

| seq_parameter_set_rbsp( ) { | Descriptor |
|---|---|
| six_minus_max_num_merge_cand | ue(v) |
| ... | |
| sps_affine_enabled_flag | u(1) |
| if( sps_affine_enabled_flag ) { | |
| five_minus_max_num_subblock_merge_cand | ue(v) |
| } | |
| ... | |
| sps_ibc_enabled_flag | u(1) |
| if( sps_ibc_enabled_flag ) | |
| six_minus_max_num_ibc_merge_cand | ue(v) |
| ... | |
| sps_geo_enabled_flag | u(1) |
| if( sps_geo_enabled_flag && MaxNumMergeCand >= 3 ) | |
| max_num_merge_cand_minus_max_num_geo_cand | ue(v) |
| } | |
| ... | |
| } | |

FIG. 19A

| picture_header_rbsp( ) { | Descriptor |
|---|---|
| ... | |
| pic_temporal_mvp_enabled_flag | u(1) |
| ... | |
| } | |

FIG. 19B

| | Descriptor |
|---|---|
| seq_parameter_set_rbsp( ) { | |
| six_minus_max_num_merge_cand | ue(v) |
| ... | |
| sps_affine_enabled_flag | u(1) |
| if( sps_affine_enabled_flag ) { | |
| five_minus_max_num_subblock_merge_cand | ue(v) |
| ... | |
| } | |
| ... | |
| sps_ibc_enabled_flag | u(1) |
| if( sps_ibc_enabled_flag ) { | |
| six_minus_max_num_ibc_merge_cand_present_flag | u(1) |
| if(six_minus_max_num_ibc_merge_cand_present_flag) | |
| six_minus_max_num_ibc_merge_cand | ue(v) |
| sps_geo_enabled_flag | u(1) |
| if( sps_geo_enabled_flag && MaxNumMergeCand >= 3 ) | |
| max_num_merge_cand_minus_max_num_geo_cand | ue(v) |
| ... | |
| } | |
| ... | |
| } | |

SIGNALING A MAXIMUM NUMBER OF MERGE MOTION VECTOR PREDICTION CANDIDATES FOR INTER PREDICTION

INCORPORATION BY REFERENCE

The present application claims the benefit of priority to U.S. patent application Ser. No. 17/088,073, "DECODER SIDE INTRA MODE DERIVATION" filed on Nov. 3, 2020, which claims the benefit of priority to U.S. Provisional Application No. 62/960,930, "SIGNALING OF MAXIMUM NUMBER OF MERGE CANDIDATES FOR INTER PREDICTION" filed on Jan. 14, 2020. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can decode, from a coded video bitstream, a first syntax element signaled at a first coding level. The first syntax element can indicate a maximum number of merge motion vector prediction (MVP) candidates. The first coding level can be higher than a picture parameter set (PPS) level. The processing circuitry can determine the maximum number of merge MVP candidates based on the first syntax element. The processing circuitry can reconstruct coding blocks associated with the first coding level based at least on the maximum number of merge MVP candidates.

In an embodiment, the processing circuitry can decode, from the coded video bitstream, a second syntax element, a third syntax element, and a fourth syntax element signaled at the first coding level. The second syntax element can indicate a maximum number of geometric merge mode merge candidates, the third syntax element can indicate a maximum number of subblock-based merge MVP candidates, and the fourth syntax element can indicate a maximum number of intra block copy (IBC) merge block vector prediction (BVP) candidates. The processing circuitry can determine (i) the maximum number of geometric merge mode merge candidates based on the second syntax element, (ii) the maximum number of subblock-based merge MVP candidates based on the third syntax element, and (iii) the maximum number of IBC merge BVP candidates based on the fourth syntax element.

In an embodiment, the first coding level is a sequence level and the first syntax element is signaled in a sequence parameter set (SPS).

In an embodiment, the processing circuitry can decode, from the coded video bitstream and based on a condition being satisfied, a second syntax element signaled at a second coding level. The second syntax element can indicate a maximum number of merge candidates for one of a geometric merge mode, a subblock-based merge mode, and an intra block copy (IBC) merge mode. In an example, the one of the geometric merge mode, the subblock-based merge mode, and the IBC merge mode is the geometric merge mode. The maximum number of merge candidates is a maximum number of geometric merge mode merge candidates. The second syntax element indicates the maximum number of geometric merge mode merge candidates. The condition is the geometric merge mode being enabled at the second coding level and the maximum number of merge MVP candidates being larger than or equal to 3. The processing circuitry can determine the maximum number of geometric merge mode merge candidates based on the second syntax element.

In an example, the one of the geometric merge mode, the subblock-based merge mode, and the IBC merge mode is the subblock-based merge mode. The maximum number of merge candidates is a maximum number of subblock-based merge MVP candidates. The second syntax element indicates the maximum number of subblock-based merge MVP candidates. The condition is an affine mode being enabled at the second coding level. The processing circuitry can determine the maximum number of subblock-based merge MVP candidates based on the second syntax element. In an example, the second syntax element is modified at a coding level that is lower than the second coding level. In an example, the first coding level and the second coding level are a sequence level, and the coding level that is lower than the second coding level is a picture level.

In an example, the one of the geometric merge mode, the subblock-based merge mode, and the IBC merge mode is the IBC merge mode. The maximum number of merge candidates is a maximum number of IBC merge block vector prediction (BVP) candidates. The second syntax element indicates the maximum number of IBC merge BVP candidates. The condition is the IBC merge mode being enabled at the second coding level. The processing circuitry can determine the maximum number of IBC merge BVP candidates based on the second syntax element.

In an example, the first coding level and the second coding level are a sequence level.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 9 shows exemplary syntax signaled in a picture parameter set (PPS).

FIG. 10 shows exemplary syntax signaled in a picture header.

FIG. 11 shows exemplary syntax signaled in a sequence parameter set (SPS).

FIG. 12 shows exemplary syntax signaled in a PPS.

FIG. 13 shows exemplary syntax signaled in a picture header.

FIG. 14 shows exemplary syntax signaled in a picture header.

FIG. 15 shows exemplary syntax in a picture header.

FIG. 16 shows exemplary syntax in a SPS.

FIG. 17 shows exemplary syntax in a SPS.

FIG. 18A shows exemplary syntax in a SPS.

FIG. 18B shows exemplary syntax in a picture header.

FIG. 19A shows exemplary syntax in a SPS.

FIG. 19B shows exemplary syntax in a picture header.

FIG. 20 shows exemplary syntax in a SPS.

DETAILED DESCRIPTION OF EMBODIMENTS

Figure 1:
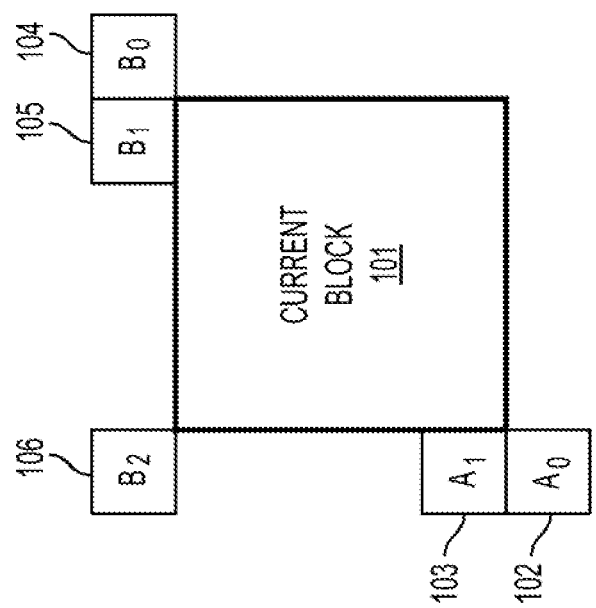
FIG. 1 is a schematic illustration of a current block and its surrounding spatial merge candidates in one example.
Figure 2:
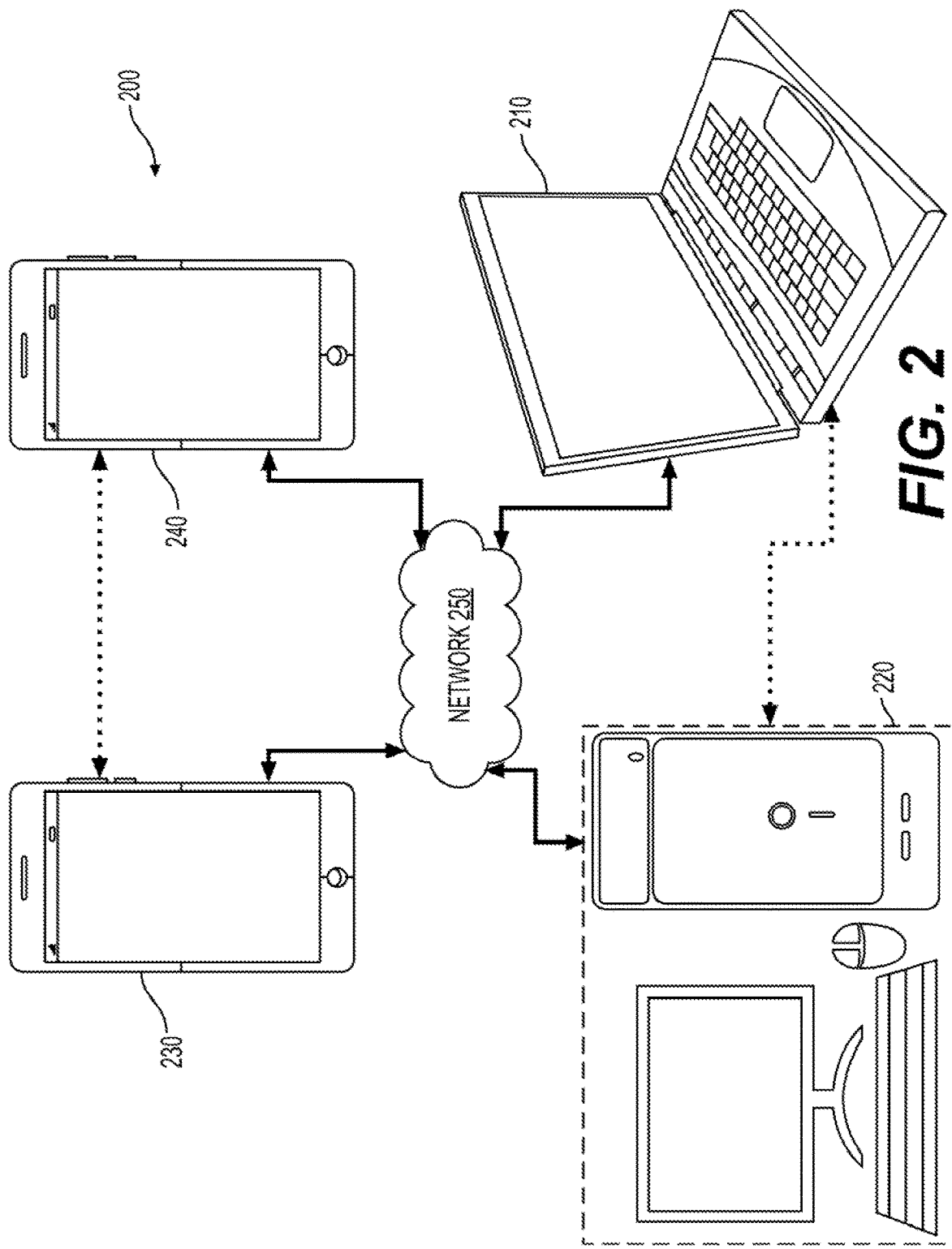
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
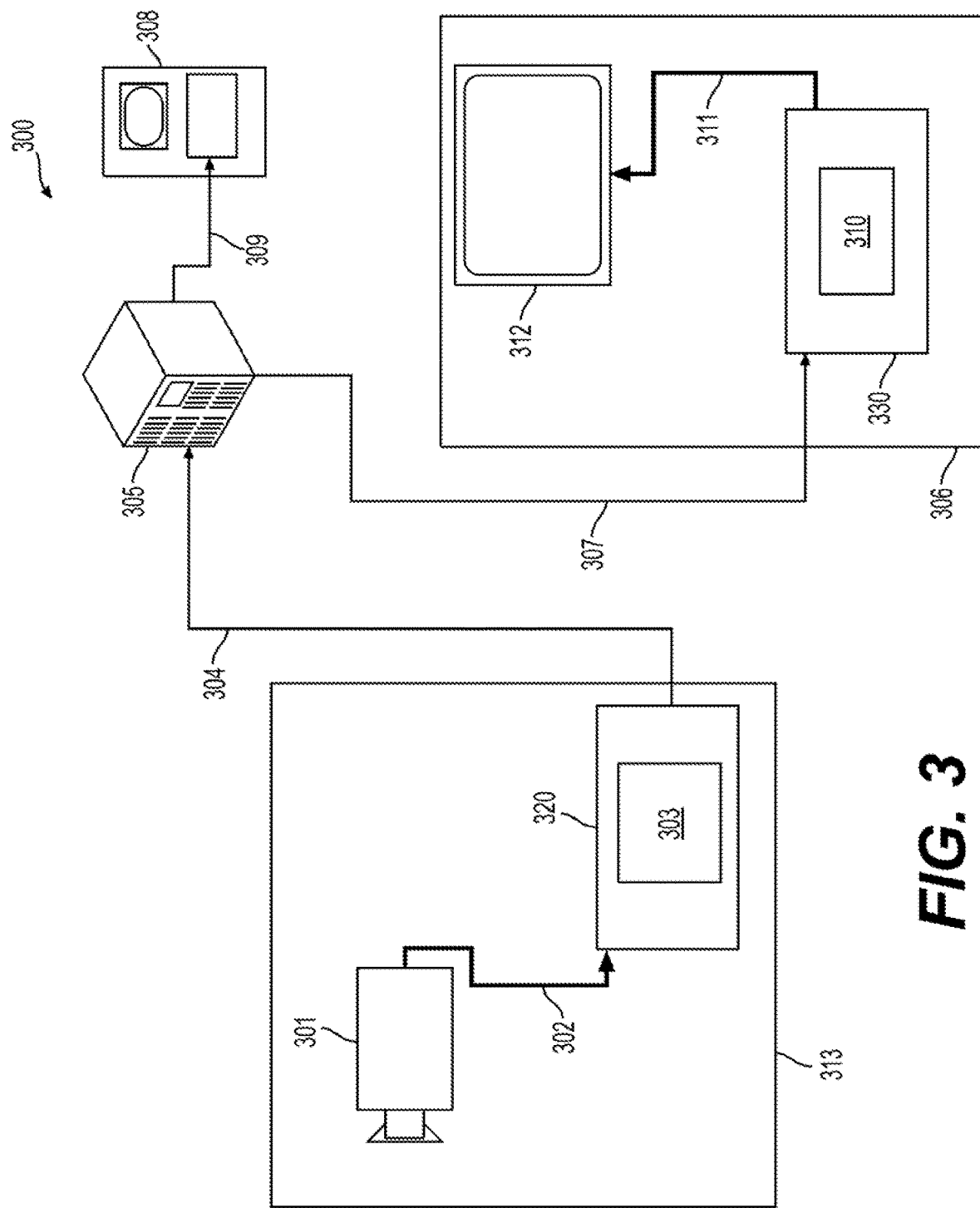
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
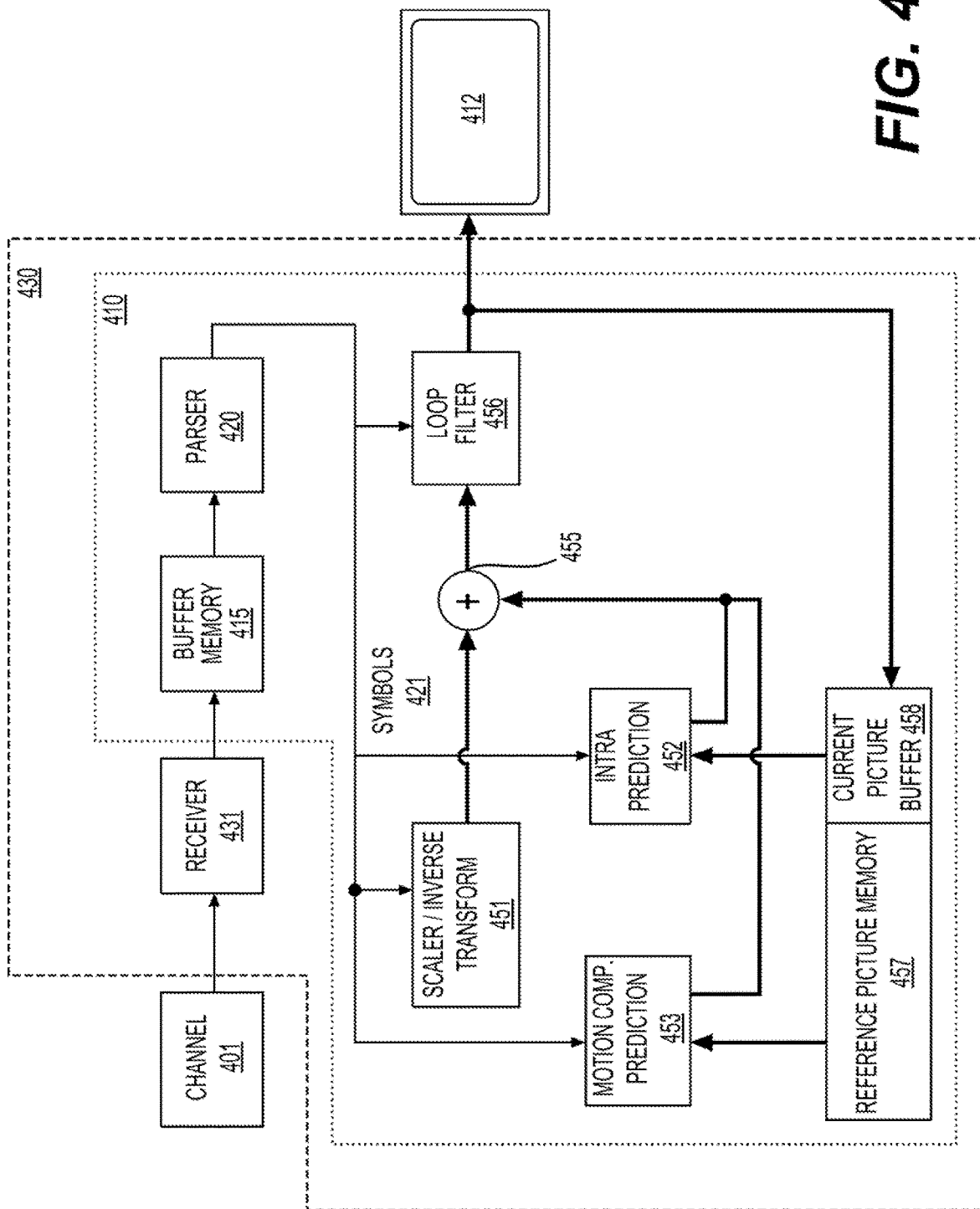
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
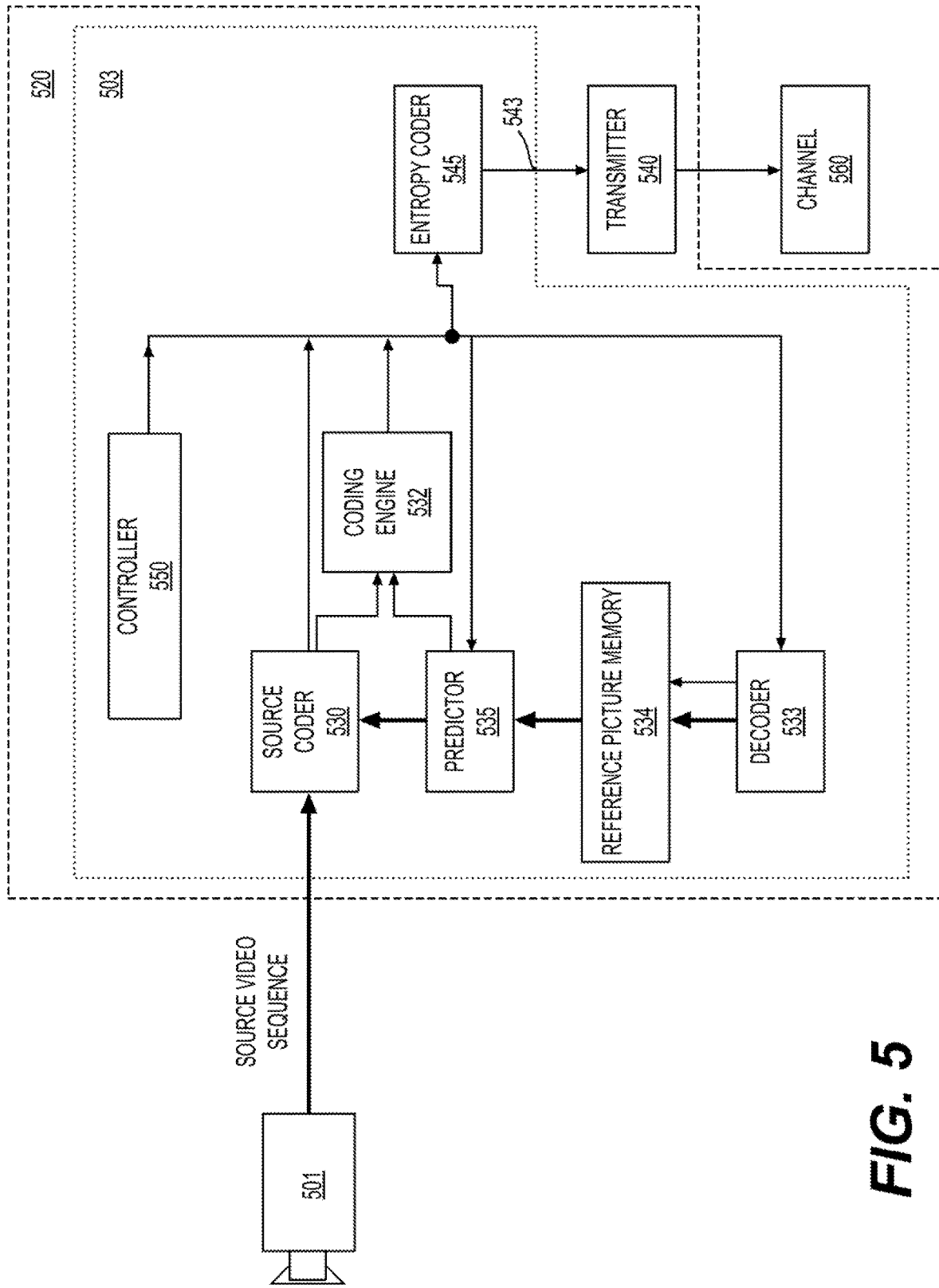
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
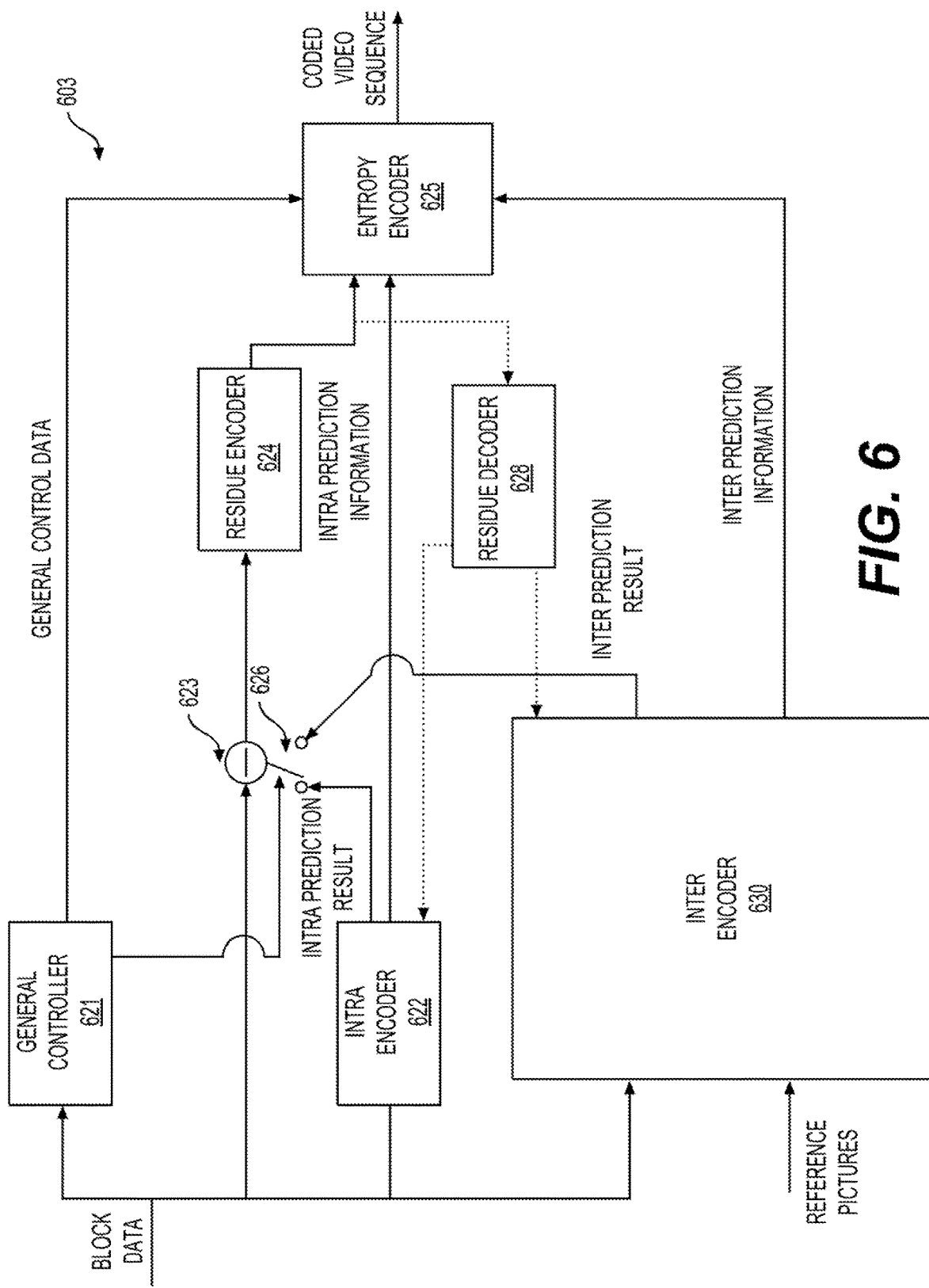
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
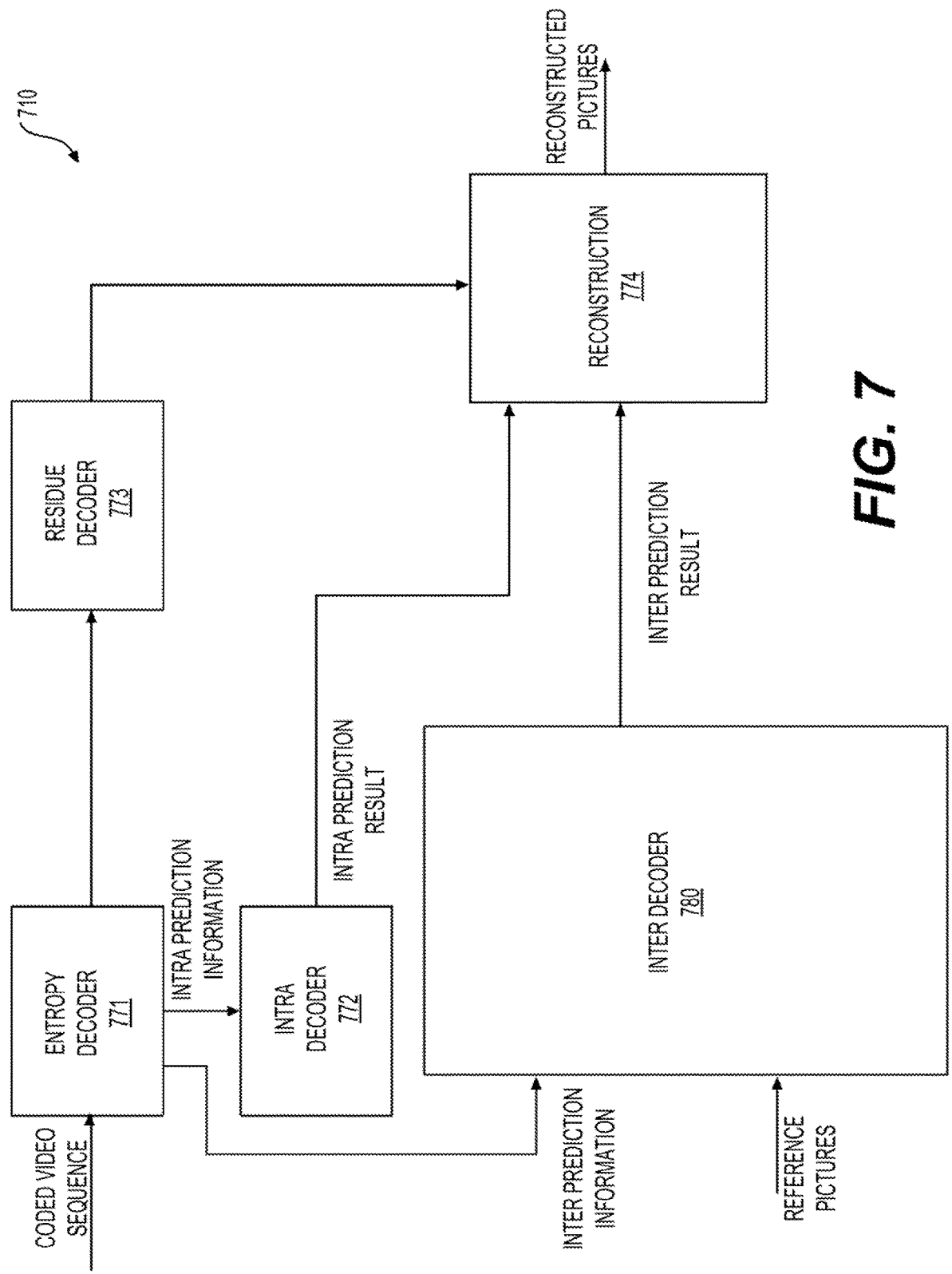
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure are related to video coding technologies, such as signaling of length(s) of various merge candidate list(s) for respective inter prediction coding tools, such as a regular merge mode, a subblock-based merge mode, an intra-block copy (IBC) merge mode, and a geometric merge mode (GEO), that are, for example, beyond HEVC and used in VVC.

Figure 8:
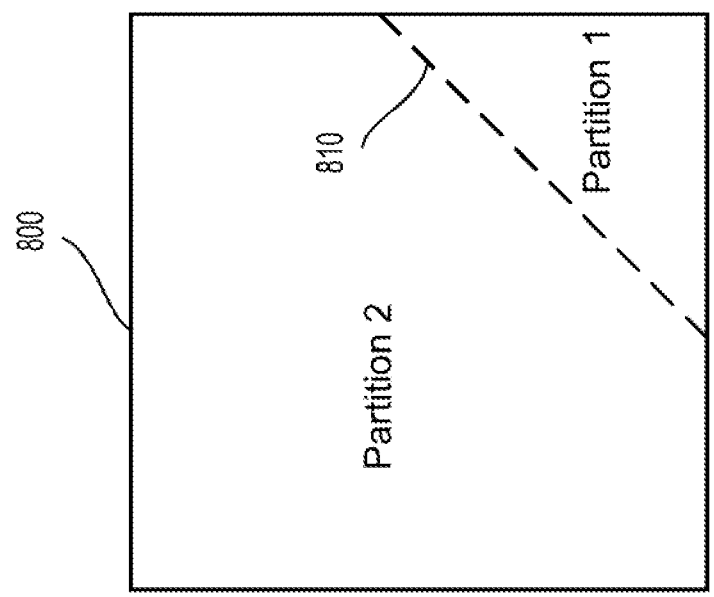
FIG. 8 shows an exemplary geometric merge mode.

The geometric merge mode (also referred to as a geometric partitioning mode) can support a plurality of different partitioning manners. FIG. 8 shows an exemplary geometric merge mode. In the geometric merge mode, the CU (800) can be partitioned into two partitions, partitions 1-2 divided by a line or an edge (810). Each of the two partitions can have any suitable shape, such as a triangle, a trapezoid, a pentagon, or the like.

Merge candidates for inter prediction can be effective in video coding, such as in HEVC and VVC. In an embodiment, such as in VVC, four different merge candidate lists (or merge lists) can be present and constructed in an encoder and a decoder side. The four merge candidate lists can include a merge candidate list (or a first merge candidate) for the regular merge mode, a merge candidate list (or a second merge candidate) for the geometric merge mode, a merge candidate list (or a third merge candidate) for the subblock-based merge mode, and a merge candidate list (or a fourth merge candidate) for the IBC merge mode.

Compared to related technology (such as certain technologies in HEVC), the first merge candidate list for the regular merge mode can be extended to include more varieties of merge candidates. In addition, a maximum number of merge candidates (or merge motion vector prediction (MVP) candidates) in the first merge candidate list can be extended, for example, from 5 to 6. The maximum number of merge MVP candidates in the first merge candidate list can be signaled in a picture parameter set (PPS) at a PPS level or in a picture header at a picture level.

FIG. 9 shows a first PPS level parameter (e.g., pps_six_minus_max_num_merge_cand_plus1) signaled in the PPS. The first PPS level parameter can indicate the maximum number of merge MVP candidates. FIG. 10 shows a first picture level parameter (e.g., pic_six_minus_max_num_merge_cand) signaled in the picture header. The first picture level parameter can indicate the maximum number of merge MVP candidates (MaxNumMergeCand).

A first syntax element can indicate the maximum number of merge MVP candidates signaled at a corresponding coding level. For example, the first syntax element refers to the first PPS level parameter signaled at the PPS level or the first picture level parameter signaled at the picture level.

The first PPS level parameter (e.g., pps_six_minus_max_num_merge_cand_plus1) being equal to 0 can specify that the first picture level parameter (e.g., pic_six_minus_max_num_merge_cand) is present (or signaled) in picture headers referring to the PPS. The first PPS level parameter (e.g., pps_six_minus_max_num_merge_cand_plus1) being greater than 0 can specify that the first picture level parameter (e.g., pic_six_minus_max_num_merge_cand) is not present (or is not signaled) in picture headers referring to the PPS. A value of the first PPS level parameter (e.g., pps_six_minus_max_num_merge_cand_plus1) can be in the range of 0 to 6, inclusive. When the first PPS level parameter (e.g., pps_six_minus_max_num_merge_cand_plus1) is not present, the first PPS level parameter (e.g., pps_six_minus_max_num_merge_cand_plus1) can be inferred to be equal to 0.

The first picture level parameter (e.g., pic_six_minus_max_num_merge_cand) can specify the maximum number of merge MVP candidates (MaxNumMergeCand) supported in slices associated with the picture header subtracted from 6. The maximum number of merge MVP candidates (MaxNumMergeCand) can be determined using Eq. 1.

$$\text{MaxNumMergeCand} = 6 - \text{pic\_six\_minus\_max\_num\_merge\_cand} \qquad \text{(Eq. 1)}$$

The value of MaxNumMergeCand can be in the range of 1 to 6, inclusive. When the first picture level parameter is not present, a value of the first picture level parameter (e.g., pic_six_minus_max_num_merge_cand) can be inferred to be equal to the first PPS level parameter (e.g., pps_six_minus_max_num_merge_cand_plus1)−1.

The geometric merge mode can be enabled or disabled in a sequence level using a SPS syntax element in a sequence parameter set (SPS). In an example, the SPS syntax element is a first sequence level flag (e.g., a sps_geo_enabled_flag). FIG. 11 shows the first sequence level flag (e.g., the sps_geo_enabled_flag) signaled in the SPS.

The first sequence level flag (e.g., the sps_geo_enabled_flag) can specify whether the geometric merge mode based motion compensation can be used for inter prediction. The first sequence level flag (e.g., the sps_geo_enabled_flag) being equal to 0 can specify that the syntax shall be constrained such that no geometric merge mode based motion compensation is used in a coded layer video sequence (CLVS), and geometric merge mode related syntax elements are not present in coding unit syntax of the CLVS. The first sequence level flag (e.g., the sps_geo_enabled_ flag) being equal to 1 can specify that geometric merge mode based motion compensation can be used in the CLVS.

Parameter(s) indicating a maximum number of geometric merge mode merge candidates (MaxNumGeoMergeCand) can be signaled explicitly at the PPS level or picture level.

FIG. 12 shows exemplary syntax signaled in a PPS. The syntax includes a second PPS level parameter (e.g., pps_max_num_merge_cand_minus_max_num_geo_cand_plus1) indicating the maximum number of geometric merge mode merge candidates. FIG. 13 shows exemplary syntax signaled in a picture header. The syntax includes a second picture level parameter (e.g., pic_max_num_merge_cand_minus_max_num_geo_cand) indicating the maximum number of geometric merge mode merge candidates.

A second syntax element can indicate the maximum number of geometric merge mode merge candidates signaled at a corresponding coding level. For example, the second syntax element refers to the second PPS level parameter signaled at the PPS level or the second picture level parameter signaled at the picture level.

The second PPS level parameter (e.g., pps_max_num_merge_cand_minus_max_num_geo_cand_plus1) being equal to 0 can specify that the second picture level parameter (e.g., pic_max_num_merge_cand_minus_max_num_geo_cand) is present or signaled in picture headers of slices referring to the PPS. The second PPS level parameter (e.g., pps_max_num_merge_cand_minus_max_num_geo_cand_plus1) being greater than 0 can specify that the second picture level parameter (e.g., pic_max_num_merge_cand_minus_max_num_geo_cand) is not present in picture headers referring to the PPS. A value of the second PPS level parameter (e.g., pps_max_num_merge_cand_minus_max_num_geo_cand_plus1) can be in a range of 0 to MaxNumMergeCand−1. When the second PPS level parameter (e.g., pps_max_num_merge_cand_minus_max_num_geo_cand_plus1) is not present, the second PPS level parameter can be inferred to be equal to 0.

The second picture level parameter (e.g., pic_max_num_merge_cand_minus_max_num_geo_cand) can specify the maximum number of geometric merge mode merge candidates supported in the slices associated with the picture header subtracted from the maximum number of merge MVP candidates (MaxNumMergeCand).

When the second picture level parameter is not present, the first sequence level flag (e.g., the sps_geo_enabled_flag) is equal to 1, and the maximum number of merge MVP candidates (MaxNumMergeCand) is greater than or equal to 2, the second picture level parameter (e.g., pic_max_num_merge_cand_minus_max_num_geo_cand) can be inferred to be equal to (the second PPS level parameter−1) (e.g., pps_max_num_merge_cand_minus_max_num_geo_cand_plus−1).

The maximum number of geometric merge mode merge candidates (MaxNumGeoMergeCand) can be determined based on the maximum number of merge MVP candidates (MaxNumMergeCand) and the second picture level parameter (e.g., pic_max_num_merge_cand_minus_max_num_geo_cand), for example, using Eq. 2.

$$\text{MaxNumGeoMergeCand} = \text{MaxNumMergeCand} - \text{pic\_max\_num\_merge\_cand\_minus\_max\_num\_geo\_cand} \quad \text{(Eq. 2)}$$

When the second picture level parameter (e.g., pic_max_num_merge_cand_minus_max_num_geo_cand) is present (i.e., signaled), a value of MaxNumGeoMergeCand can be in a range of 2 to MaxNumMergeCand, inclusive.

When the second picture level parameter (e.g., pic_max_num_merge_cand_minus_max_num_geo_cand) is not present (i.e., is not signaled) and one of (i) the first sequence level flag (e.g., the sps_geo_enabled_flag) is equal to 0 and (ii) the maximum number of merge MVP candidates (MaxNumMergeCand) is less than 2 is satisfied, the maximum number of geometric merge mode merge candidates (MaxNumGeoMergeCand) cam be set to be equal to 0.

When the maximum number of geometric merge mode merge candidates (MaxNumGeoMergeCand) is equal to 0, the geometric merge mode is not allowed for the slices associated with the picture header.

The second PPS level parameter (e.g., pps_max_num_merge_cand_minus_max_num_geo_cand_plus1), the second picture level parameter (e.g., pic_max_num_merge_cand_minus_max_num_geo_cand), and the maximum number of merge MVP candidates (MaxNumMergeCand) can be used to determine the maximum number of geometric merge mode merge candidates (MaxNumGeoMergeCand). The maximum number of geometric merge mode merge candidates (MaxNumGeoMergeCand) can be designated to not exceed the value of MaxNumMergeCand. The value of MaxNumGeoMergeCand can vary, for example, depending on specific applications. PPS signaling can be effective when the value of MaxNumGeoMergeCand does not vary frequently, and thus does not need to be signaled for each picture. On the other hand, picture header signaling can be effective when MaxNumGeoMergeCand changes frequently, for example, from one picture to another picture.

FIG. 14 shows exemplary syntax signaled in a picture header. The syntax includes a third picture level parameter signaled in the picture header (e.g., pic_five_minus_max_num_subblock_merge_cand1) indicating a maximum number of subblock-based merge MVP candidates (MaxNumSubblockMergeCand) (also referred to as a maximum number of merge candidates for the subblock-based merge mode).

A third syntax element can indicate the maximum number of subblock-based merge MVP candidates signaled at a corresponding coding level. For example, the third syntax element refers to the third picture level parameter signaled at the picture level.

The third picture level parameter (e.g., pic_five_minus_max_num_subblock_merge_cand) can specify the maximum number of subblock-based merge MVP candidates supported in a slice subtracted from a value of 5. When the third picture level parameter is not present (or is not signaled), a value of the third picture level parameter (e.g., pic_five_minus_max_num_subblock_merge_cand) can be inferred to be equal to (5−(sps_sbtmvp_enabled_flag && pic_temporal_mvp_enabled_flag)). In an example, the sps_sbtmvp_enabled_flag is a SPS level flag indicating whether a SBTMVP mode is enabled at the SPS level. In an example, the pic_temporal_mvp_enabled_flag is a picture level flag indicating whether a temporal MVP mode is enabled at the picture level.

The maximum number of subblock-based merge MVP candidates (MaxNumSubblockMergeCand) can be determined based on the third picture level parameter, for example (e.g., pic_five_minus_max_num_subblock_merge_cand), using Eq. 3.

$$\text{MaxNumSubblockMergeCand} = 5 - \text{pic\_five\_minus\_max\_num\_subblock\_merge\_cand} \quad \text{(Eq. 3)}$$

A value of the maximum number of subblock-based merge MVP candidates (MaxNumSubblockMergeCand) can be in a range of 0 to 5, inclusive.

FIG. 15 shows exemplary syntax signaled in a picture header. The syntax includes a fourth picture level parameter (e.g., pic_six_minus_max_num_ibc_merge_cand) indicating a maximum number of IBC merge block vector prediction (BVP) candidates (MaxNumIbcMergeCand) for the IBC merge mode.

A fourth syntax element can indicate the maximum number of IBC merge BVP candidates signaled at a corresponding coding level. For example, the fourth syntax element refers to the fourth picture level parameter signaled at the picture level.

The fourth picture level parameter (e.g., pic_six_minus_max_num_ibc_merge_cand) can specify the maximum number of IBC merge BVP candidates supported in slices associated with the picture header subtracted from a value of 6. The maximum number of IBC merge BVP candidates (MaxNumIbcMergeCand) can be determined based on the fourth picture level parameter (e.g., pic_six_minus_max_num_ibc_merge_cand), for example, using Eq. 4.

$$MaxNumIbcMergeCand = 6 - pic\_six\_minus\_max\_num\_ibc\_merge\_cand \quad (Eq. 4)$$

A value of the maximum number of IBC merge BVP candidates (MaxNumIbcMergeCand) can be in a range of 1 to 6, inclusive.

The syntax elements can include the first syntax element, the second syntax element, the third syntax element, the fourth syntax element, and the like. As described above, the first syntax element can indicate the maximum number of merge MVP candidates signaled at a corresponding coding level (e.g., a coding level higher than a slice level or a picture level) and thus the first syntax element can indicate a length of merge MVP candidate list for the regular merge mode. The merge MVP candidate list can include merge MVP candidates for the regular merge mode. For example, the first syntax element refers to the first PPS level parameter signaled at the PPS level or the first picture level parameter signaled at the picture level.

The second syntax element can indicate the maximum number of geometric merge mode merge candidates signaled at a corresponding coding level (e.g., a coding level higher than a slice level or a picture level) and thus the second syntax element can indicate a length of geometric merge mode merge candidate list for the geometric merge mode. The geometric merge mode merge candidate list can include geometric merge mode merge candidates for the geometric merge mode. For example, the second syntax element refers to the second PPS level parameter signaled at the PPS level or the second picture level parameter signaled at the picture level.

The third syntax element can indicate the maximum number of subblock-based merge MVP candidates signaled at a corresponding coding level (e.g., a coding level higher than a slice level or a picture level) and thus the third syntax element can indicate a length of subblock-based merge MVP candidate list for the subblock-based merge mode. The subblock-based merge MVP candidate list can include subblock-based merge MVP candidates for the subblock-based merge mode. For example, the third syntax element refers to the third picture level parameter signaled at the picture level.

The fourth syntax element can indicate the maximum number of IBC merge BVP candidates signaled at a corresponding coding level (e.g., a coding level higher than a slice level or a picture level) and thus the fourth syntax element can indicate a length of IBC merge BVP candidate list (or IBC merge candidate list) for the IBC merge mode. The IBC merge BVP candidate list can include IBC merge BVP candidates for the IBC merge mode. For example, the fourth syntax element refers to the fourth picture level parameter signaled at the picture level.

According to aspects of the disclosure, the first syntax element signaled at a first coding level can be decoded from a coded video bitstream. The first syntax element can indicate the maximum number of merge MVP candidates. The first coding level can be any suitable coding level, for example, higher than a slice level. In an example, the first coding level is higher than a PPS level. The maximum number of merge MVP candidates can be determined based on the first syntax element, for example, based on Eq. 5. Subsequently, coding blocks associated with the first coding level can be reconstructed based at least on the maximum number of merge MVP candidates. In an example, the first coding level is a sequence level and the first syntax element is signaled in a SPS. The coding efficiency can increase and a signaling overhead can decrease when the first coding level increases from a lower coding level (e.g., the PPS level) to a higher coding level (e.g., the sequence level).

According to aspects of the disclosure, one or more of the syntax elements related to length(s) of corresponding merge candidate lists (e.g., the merge MVP candidate list, the geometric merge mode merge candidate list, the subblock-based merge MVP candidate list, the IBC merge BVP candidate list, and/or the like) can be signaled in the first coding level. The first coding level can be any suitable coding level. In an example, the first coding level is higher than a slice level or a picture level. In an example, the first coding level is higher than the PPS level. The one or more of the syntax elements can include the first syntax element.

In an embodiment, the one or more of the syntax elements include the first syntax element, the second syntax element, the third syntax element, and the fourth syntax element and are signaled in the SPS at the sequence level. In an example the first syntax element, the second syntax element, the third syntax element, and the fourth syntax element do not change in the first coding level. In an example, the first coding level is the sequence level. When certain syntax elements, such as the one or more of the syntax elements including the first syntax element, the second syntax element, the third syntax element, and the fourth syntax element, do not change at the sequence level, signaling the certain syntax elements at the sequence level instead of at a lower coding level (e.g., a PPS level, a picture level, or a slice level) can increase coding efficiency and/or decrease a signaling overhead.

In an embodiment, the second syntax element, the third syntax element, and the fourth syntax element can be signaled at the first coding level and can be decoded from the coded video bitstream. The second syntax element can indicate the maximum number of geometric merge mode merge candidates, the third syntax element can indicate the maximum number of subblock-based merge MVP candidates, and the fourth syntax element can indicate the maximum number of IBC merge BVP candidates. The maximum number of geometric merge mode merge candidates can be determined based on the second syntax element, the maximum number of subblock-based merge MVP candidates can be determined based on the third syntax element, and the maximum number of IBC merge BVP candidates can be determined based on the fourth syntax element.

FIG. 16 shows exemplary syntax elements in the SPS. The syntax elements include the first syntax element (e.g., six_minus_max_num_merge_cand), the second syntax element (e.g., max_num_merge_cand_minus_max_num_geo_cand), the third syntax element (e.g., five_minus_max_num_subblock_merge_cand), and the fourth syntax element (e.g., six_minus_max_num_ibc_merge_cand).

The first syntax element (e.g., six_minus_max_num_merge_cand) can specify the maximum number of merge MVP candidates supported in the SPS subtracted from a value of 6. The maximum number of merge MVP candidates (MaxNumMergeCand) can be determined based on the first syntax element (e.g., six_minus_max_num_merge_cand), for example, based on Eq. 5.

$$\text{MaxNumMergeCand}=6-\text{six\_minus\_max\_num\_merge\_cand} \qquad \text{(Eq. 5)}$$

A value of MaxNumMergeCand can be in a range of 1 to 6, inclusive.

The second syntax element (e.g., max_num_merge_cand_minus_max_num_geo_cand) can specify the maximum number of geometric merge mode merge candidates supported in the SPS subtracted from MaxNumMergeCand.

The maximum number of geometric merge mode merge candidates (MaxNumGeoMergeCand) can be determined based on the second syntax element and the maximum number of merge MVP candidates, for example, using Eq. 6.

$$\text{MaxNumGeoMergeCand}=\text{MaxNumMergeCand}-\text{max\_num\_merge\_cand\_minus\_max\_num\_geo\_cand} \qquad \text{(Eq. 6)}$$

When the second syntax element (e.g., max_num_merge_cand_minus_max_num_geo_cand) is present (or is signaled), a value of the maximum number of geometric merge mode merge candidates (MaxNumGeoMergeCand) can be in a range of 2 to the maximum number of merge MVP candidates (MaxNumMergeCand), inclusive.

The third syntax element (e.g., five_minus_max_num_subblock_merge_cand) can specify the maximum number of subblock-based merge MVP candidates supported in the SPS subtracted from a value of 5.

The maximum number of subblock-based merge MVP candidates (MaxNumSubblockMergeCand) can be determined based on the third syntax element (e.g., five_minus_max_num_subblock_merge_cand), for example, using Eq. 7.

$$\text{MaxNumSubblockMergeCand}=5-\text{five\_minus\_max\_num\_subblock\_merge\_cand} \qquad \text{(Eq. 7)}$$

A value of MaxNumSubblockMergeCand can be in a range of 0 to 5, inclusive.

The fourth syntax element (e.g., six_minus_max_num_ibc_merge_cand) can specify the maximum number of IBC merge BVP candidates supported in the SPS subtracted from a value of 6. The maximum number of IBC merge BVP candidates (MaxNumIbcMergeCand) can be determined based on the fourth syntax element (e.g., six_minus_max_num_ibc_merge_cand), for example, using Eq. 8.

$$\text{MaxNumIbcMergeCand}=6-\text{six\_minus\_max\_num\_ibc\_merge\_cand} \qquad \text{(Eq. 8)}$$

A value of MaxNumIbcMergeCand can be in a range of 0 to 6, inclusive.

In an example, the syntax elements including the first syntax element, the second syntax element, the third syntax element, and the fourth syntax element are signaled in the PPS. Thus, the first syntax element, the second syntax element, the third syntax element, and the fourth syntax element may not change within the PPS, and can change from a first PPS to a second PPS.

According to aspects of the disclosure, one or more of the syntax elements related to the length(s) of corresponding merge candidates list(s) can be conditionally signaled, for example, based on whether a corresponding inter prediction coding tool (or inter coding tool) is enabled. In an embodiment, the first syntax element indicate the maximum number of merge MVP candidates (or the length of merge MVP candidate list for the regular merge mode) is signaled, and remaining syntax elements (e.g., the second syntax element, the third syntax element, the fourth syntax element, and the like) related to the lengths of other merge candidate lists may or may not be signaled. Accordingly, an enabling flag for a specific inter coding tool can be used to control signaling of the corresponding syntax element related to the length of merge candidate list for the specific inter coding tool. Thus, in some examples, when the enabling flag for the specific inter coding tool indicates that the specific inter coding tool is disabled, the corresponding syntax element is not signaled, thus increasing coding efficiency and/or decreasing a signaling overhead.

In an embodiment, a syntax element signaled at a second coding level can be decoded from the coded video bitstream and based on a condition being satisfied. The syntax element can indicate a maximum number of merge candidates for one of the geometric merge mode, the subblock-based merge mode, the IBC merge mode, and the like.

In an example, the one of the geometric merge mode, the subblock-based merge mode, and the IBC merge mode is the geometric merge mode. The maximum number of merge candidates is the maximum number of geometric merge mode merge candidates. The syntax element is the second syntax element indicating the maximum number of geometric merge mode merge candidates. Referring to a box (1712) in FIG. 17, the condition is the geometric merge mode being enabled at the second coding level and the maximum number of merge MVP candidates being larger than or equal to 3. The maximum number of geometric merge mode merge candidates can be determined based on the second syntax element.

In an example, the one of the geometric merge mode, the subblock-based merge mode, and the IBC merge mode is the subblock-based merge mode. The maximum number of merge candidates is the maximum number of subblock-based merge MVP candidates. The syntax element is the third syntax element indicating the maximum number of subblock-based merge MVP candidates. Referring to a box (1710) in FIG. 17, the condition is an affine mode being enabled at the second coding level. The maximum number of subblock-based merge MVP candidates can be determined based on the third syntax element.

In an example, the one of the geometric merge mode, the subblock-based merge mode, and the IBC merge mode is the IBC merge mode. The maximum number of merge candidates is the maximum number of IBC merge BVP candidates. The syntax element is the fourth syntax element indicating the maximum number of IBC merge BVP candidates. Referring to a box (1711) in FIG. 17, the condition is the IBC merge mode being enabled at the second coding level. The maximum number of IBC merge BVP candidates can be determined based on the fourth syntax element.

In an example, the first syntax element indicating the length of merge MVP candidate list is signaled in the SPS, and the second syntax element indicating the length of the geometric merge mode merge candidate list, the third syntax element indicating the length of the subblock-based merge MVP candidate list, and the fourth syntax element indicating the length of the IBC merge candidate list are signaled conditionally, for example, at the sequence level as shown in FIG. 17.

Referring to FIG. 17, the first syntax element (e.g., six_minus_max_num_merge_cand) is signaled in the SPS. As described above, the first syntax element (e.g., six_minus_max_num_merge_cand) can specify the maximum number of merge MVP candidates supported in the SPS subtracted from a value of 6. The maximum number of merge MVP candidates (MaxNumMergeCand) can be determined based on the first syntax element (e.g., six_minus_max_num_merge_cand), for example, based on Eq. 5. The value of MaxNumMergeCand can be in the range of 1 to 6, inclusive.

Referring to the box (1712) in FIG. 17, the second syntax element (e.g., max_num_merge_cand_minus_max_num_geo_cand) can be signaled when the first sequence level flag (e.g., the sps_geo_enabled_flag) is equal to 1 and the maximum number of merge MVP candidates (MaxNumMergeCand) is larger than or equal to 3. In an example, the first sequence level flag (e.g., the sps_geo_enabled_flag) being equal to 1 indicates that the geometric merge mode is enabled at the sequence level.

The second syntax element (e.g., max_num_merge_cand_minus_max_num_geo_cand) can specify the maximum number of geometric merge mode merge candidates supported in the SPS subtracted from MaxNumMergeCand.

The maximum number of GEO merge mode candidates (MaxNumGeoMergeCand) can be determined using Eq. 6.

When the second syntax element (e.g., max_num_merge_cand_minus_max_num_geo_cand) is present, the value of the maximum number of GEO merge mode candidates (MaxNumGeoMergeCand) can be in the range of 2 to the maximum number of merge MVP candidate (MaxNumMergeCand), inclusive.

When the second syntax element (e.g., max_num_merge_cand_minus_max_num_geo_cand) is not present, the first sequence level flag (e.g., the sps_geo_enabled_flag) is equal to 1, and the maximum number of merge MVP candidate (MaxNumMergeCand) is equal to 2, the maximum number of GEO merge mode candidates (MaxNumGeoMergeCand) can be set to 2.

When the second syntax element (e.g., max_num_merge_cand_minus_max_num_geo_cand) is not present (or is not signaled) and one of (i) the first sequence level flag (e.g., the sps_geo_enabled_flag) is equal to 0 and (ii) the maximum number of merge MVP candidates (MaxNumMergeCand) is less than 2 is satisfied, the maximum number of geometric merge mode merge candidates (MaxNumGeoMergeCand) can be set to be equal to 0.

Referring to the box (1710) in FIG. 17, the third syntax element (e.g., five_minus_max_num_subblock_merge_cand) can be signaled when a second sequence level flag (e.g., a sps_affine_enabled_flag) is equal to 1. In an example, the second sequence level flag (e.g., the sps_affine_enabled_flag) being equal to 1 indicates that an affine mode is enabled at the sequence level.

The third syntax element (e.g., five_minus_max_num_subblock_merge_cand) can specify the maximum number of subblock-based merge MVP candidates supported in the SPS subtracted from a value of 5. When the third syntax element is not present, the value of the third syntax element (e.g., five_minus_max_num_subblock_merge_cand) can be inferred to be equal to (5−sps_sbtmvp_enabled_flag).

The maximum number of subblock-based merge MVP candidates (MaxNumSubblockMergeCand) can be determined based on Eq. 7.

The value of MaxNumSubblockMergeCand can be in the range of 0 to 5, inclusive.

Referring to the box (1711) in FIG. 17, the fourth syntax element (e.g., six_minus_max_num_ibc_merge_cand) can be signaled when a third sequence level flag (e.g., a sps_ibc_enabled_flag) is equal to 1. In an example, the third sequence level flag (e.g., the sps_ibc_enabled_flag) being equal to 1 indicates that the IBC merge mode is enabled at the sequence level.

The fourth syntax element (e.g., six_minus_maxnum_ibc_ merge_cand) can specify the maximum number of IBC merge zBVP candidates supported in the SPS subtracted from a value of 6. The maximum number of IBC merge BVP candidates (MaxNumIbcMergeCand) can be determined based on the fourth syntax element (e.g., six_minus_max_num_ibc_merge_cand), for example, using Eq. 8.

When the fourth syntax element (e.g., six_minus_max_num_ibc_merge_cand) is not present, MaxNumIbcMergeCand can be equal to 0.

The value of MaxNumIbcMergeCand can be in the range of 0 to 6, inclusive.

In an example, as shown in FIG. 17, the first syntax element is signaled in the first coding level (e.g., the sequence level), and the second syntax element, the third syntax element, and the fourth syntax element are conditionally signaled in the second coding level (e.g., the sequence level). Alternatively, the first syntax element is signaled in the first coding level (e.g., the sequence level), and one or more of (i) the second syntax element, (ii) the third syntax element, (iii) the fourth syntax element, and/or other syntax element are conditionally signaled in the second coding level (e.g., the sequence level). The first coding level can be identical to or higher than the second coding level. In an example, the first coding level and the second coding level are the sequence level.

In an embodiment, the first syntax element indicating the length of merge MVP candidate list is signaled in the first coding level, and the second syntax element indicating the length of the geometric merge mode merge candidate list, the third syntax element indicating the length of the subblock-based merge MVP candidate list, and the fourth syntax element indicating the length of the IBC merge candidate list are signaled conditionally in the first coding level. In an example, the first coding level is higher than a slice level (or a slice header), a picture level (or a picture header), or the like. In an example, the first coding level is the sequence level.

Certain syntax elements (e.g., the first syntax element) do not change at the first coding level (e.g., the sequence level) and remain constant for pictures, slices, and/or the like within a sequence. Thus, the certain syntax elements can be signaled at the first coding level (e.g., a high coding level) instead of at a coding level that is lower than the first coding level, for example, to improve coding efficiency and/or reduce a signaling overhead. Other syntax elements (e.g., the third syntax element) can change at the first coding level, and thus can be signaled at the second coding level (e.g., a low coding level) that is lower than the first coding level, for example, to increase flexibility. For example, the first coding level is the sequence level, the third syntax element changes within a sequence and does not change within a picture, and thus is signaled at the picture level (e.g., the second coding level).

In an embodiment, the first syntax element indicating the length of merge MVP candidate list is signaled in the first coding level, and the second syntax element indicating the length of the geometric merge mode merge candidate list and the fourth syntax element indicating the length of the IBC merge candidate list are signaled conditionally in the first coding level. Other syntax element(s) indicating the length(s) of other merge candidate lists, such as the third syntax element indicating the length of the subblock-based merge MVP candidate list, can be signaled in the second coding level that is lower than the first coding level. In an example, the first coding level is the sequence level, and the second coding level is the PPS level, the picture level, or the slice level.

In an example, only the first syntax element, the second syntax element, and the fourth syntax element are signaled in the SPS at the sequence level. Other syntax element(s) indicating the length(s) of other merge candidate lists are signaled in a level (e.g., the picture level) that is lower than the sequence level. The other syntax element(s) can include the third syntax element. In an example, the third syntax element changes within the SPS, for example, from a first picture to a second picture, and thus the third syntax element is signaled at the picture level for each picture to have better flexibility.

FIG. 18A shows that the first syntax element, the second syntax element, and the fourth syntax element (e.g., six_minus_max_num_ibc_merge_cand) are signaled in the SPS at the sequence level. FIG. 18B shows that the third syntax element is signaled in the picture header at the picture level. The syntax elements shown in FIGS. 18A-18B can be applicable where the first syntax element (e.g., six_minus_max_num_merge_cand), the second syntax element (e.g., max_num_merge_cand_minus_max_num_geo_cand), and the fourth syntax element do not change at the sequence level and the third syntax element (e.g., five_minus_max_num_subblock_merge_cand) can change within a sequence.

In an embodiment, the first syntax element indicating the length of merge MVP candidate list remains unchanged (e.g., cannot be updated, overridden, or modified) at a coding level that is lower than the first coding level. The second syntax element and the fourth syntax element that are conditionally signaled at the second coding level remain unchanged (e.g., cannot be updated, overridden, or modified) at a coding level that is lower than the second coding level. In an example, only syntax element(s) indicating the length(s) of other merge candidate list(s) that exclude any one of the merge MVP candidate list, the geometric merge mode merge candidate list, and the IBC merge candidate list may be updated, overridden, or modified in the coding level that is lower than the second coding level. In an example, the third syntax element that is conditionally signaled at the second coding level is modified at a coding level that is lower than the second coding level. For example, the third syntax element that is conditionally signaled at the second coding level (e.g., the sequence level) is modified at the picture level.

In an example, only the third syntax element indicating the length of the subblock-based merge candidate list can be modified, overridden, or updated in the coding level (e.g., the picture level) that is lower than the first coding level (e.g., the sequence level).

FIG. 19A shows that the first syntax element, the second syntax element, and the fourth syntax element (e.g., six_minus_max_num_ibc_merge_cand) are signaled in the SPS at the sequence level and remain unchanged at the sequence level. FIGS. 19A-19B show that the third syntax element is signaled in the SPS at the sequence level and can be further modified in the picture header at the picture level. The syntax elements shown in FIGS. 19A-19B can be applicable where the first syntax element (e.g., six_minus_max_num_merge_cand), the second syntax element (e.g., max_num_merge_cand_minus_max_num_geo_cand), and the fourth syntax element do not change at the sequence level and the third syntax element (e.g., five_minus_max_num_subblock_merge_cand) can be modified from one picture to another picture.

When the third syntax element (e.g., five_minus_max_num_subblock_merge_cand) is not present in the SPS, and both the pic_temporal_mvp_enabled_flag and the sps_sbtmvp_enabled_flag are equal to 1, the maximum number of subblock-based merge MVP candidates (MaxNumSubblockMergeCand) can be equal to 1 for slices associated the current picture header.

According to aspects of the disclosure, when one or more of the first syntax element, the second syntax element, the third syntax element, and the fourth syntax element are signaled at the first coding level (e.g., the sequence level), for example, higher than the slice level or the picture level. The one or more of the first syntax element, the second syntax element, the third syntax element, and the fourth syntax element cannot be updated, overridden, or modified at a coding level (e.g., the PPS level, the picture level, or the slice level) lower than the first coding level (e.g., the sequence level).

In an example, the first syntax element, the second syntax element, the third syntax element, and the fourth syntax element are signaled in the SPS at the sequence level, and the first syntax element, the second syntax element, the third syntax element, and the fourth syntax element cannot be updated, overridden, or modified in a coding level (e.g., the PPS level, the picture level, or the slice level) lower than the sequence level.

In an example, the first syntax element, the second syntax element, the third syntax element, and the fourth syntax element are signaled in the PPS at the PPS level, and the first syntax element, the second syntax element, the third syntax element, and the fourth syntax element cannot be updated, overridden, or modified in a coding level (e.g., the picture level, or the slice level) lower than the PPS level.

According to aspects of the disclosure, additional syntax element(s) can be used to further indicate the presence of one or more of the syntax elements related to the lengths of the various merge candidate lists.

In an example, as indicated by a box (2010) in FIG. 20, a syntax element or a flag (e.g., a six_minus_max_num_ibc_merge_cand_present flag) indicating the presence of the fourth syntax element related to the length of IBC merge BVP candidate list is used to further indicate whether the fourth syntax element is present, as shown in FIG. 20. Accordingly, the presence of the fourth syntax element is conditionally determined based on the syntax element (e.g., a six_minus_max_num_ibc_merge_cand_present flag) in addition to the third sequence level flag (e.g., the sps_ibc_enabled_flag). The fourth syntax element is conditionally signaled based on the syntax element (e.g., a six_minus_max_num_ibc_merge_cand_present flag) and the third sequence level flag (e.g., the sps_ibc_enabled_flag). The above description can be suitably adapted to the signaling of the other syntax elements, such as the second syntax element, the third syntax element, and/or the like.

The first syntax element (e.g., six_minus_max_num_merge_cand) can specify the maximum number of merge MVP candidates supported in the SPS subtracted from a value of 6. The maximum number of merge MVP candidates (MaxNumMergeCand) can be determined based on Eq. 5 as described above. The value of MaxNumMergeCand can be in the range of 1 to 6, inclusive.

The second syntax element (e.g., max_num_merge_cand_minus_max_num_geo_cand) can specify the maximum number of geometric merge mode merge candidates supported in the SPS subtracted from MaxNumMergeCand.

The maximum number of geometric merge mode merge candidates (MaxNumGeoMergeCand) can be determined based on Eq. 6 as described above.

When max_num_merge_cand_minus_max_num_geo_cand is present, the value of MaxNumGeoMergeCand can be in the range of 2 to MaxNumMergeCand, inclusive.

When max_num_merge_cand_minus_max_num_geo_cand is not present, and the sps_geo_enabled_flag is equal to 1 and MaxNumMergeCand is equal to 2, MaxNumGeoMergeCand is set to be equal to 2.

When max_num_merge_cand_minus_max_num_geo_cand is not present, and (the sps_geo_enabled_flag is equal to 0 or MaxNumMergeCand is less than 2), MaxNumGeoMergeCand is set to be equal to 0.

The third syntax element (e.g., five_minus_max_num_subblock_merge_cand) can specify the maximum number of subblock-based merge MVP candidates supported in the SPS subtracted from a value of 5. When the second syntax element is not present, the value of five_minus_max_num_subblock_merge_cand can be inferred to be equal to (5−sps_sbtmvp_enabled_flag).

The maximum number of subblock-based merge MVP candidates (MaxNumSubblockMergeCand) can be determined based on Eq. 7 as described above.

The value of MaxNumSubblockMergeCand can be in the range of 0 to 5, inclusive.

The syntax element, the six_minus_max_num_ibc_merge_cand_present flag, can specify the presence of the maximum number of IBC merge BVP candidates. When the six_minus_max_num_ibc_merge_cand_present flag is not present, the six_minus_max_num_ibc_merge_cand_present flag can be inferred to be 0. When the six_minus_max_num_ibc_merge_cand_present flag is present, the fourth syntax element (e.g., six_minus_max_num_ibc_merge_cand) is present in the bitstream.

The fourth syntax element (e.g., six_minus_max_num_ibc_merge_cand) can specify the maximum number of IBC merge BVP candidates supported in the SPS subtracted from a value of 6. The maximum number of IBC merge BVP candidates (MaxNumIbcMergeCand) can be determined using Eq. 8.

When the fourth syntax element (e.g., six_minus_max_num_ibc_merge_cand) is not present, MaxNumIbcMergeCand can be equal to 0.

The value of MaxNumIbcMergeCand can be in the range of 1 to 6, inclusive.

Figure 21:
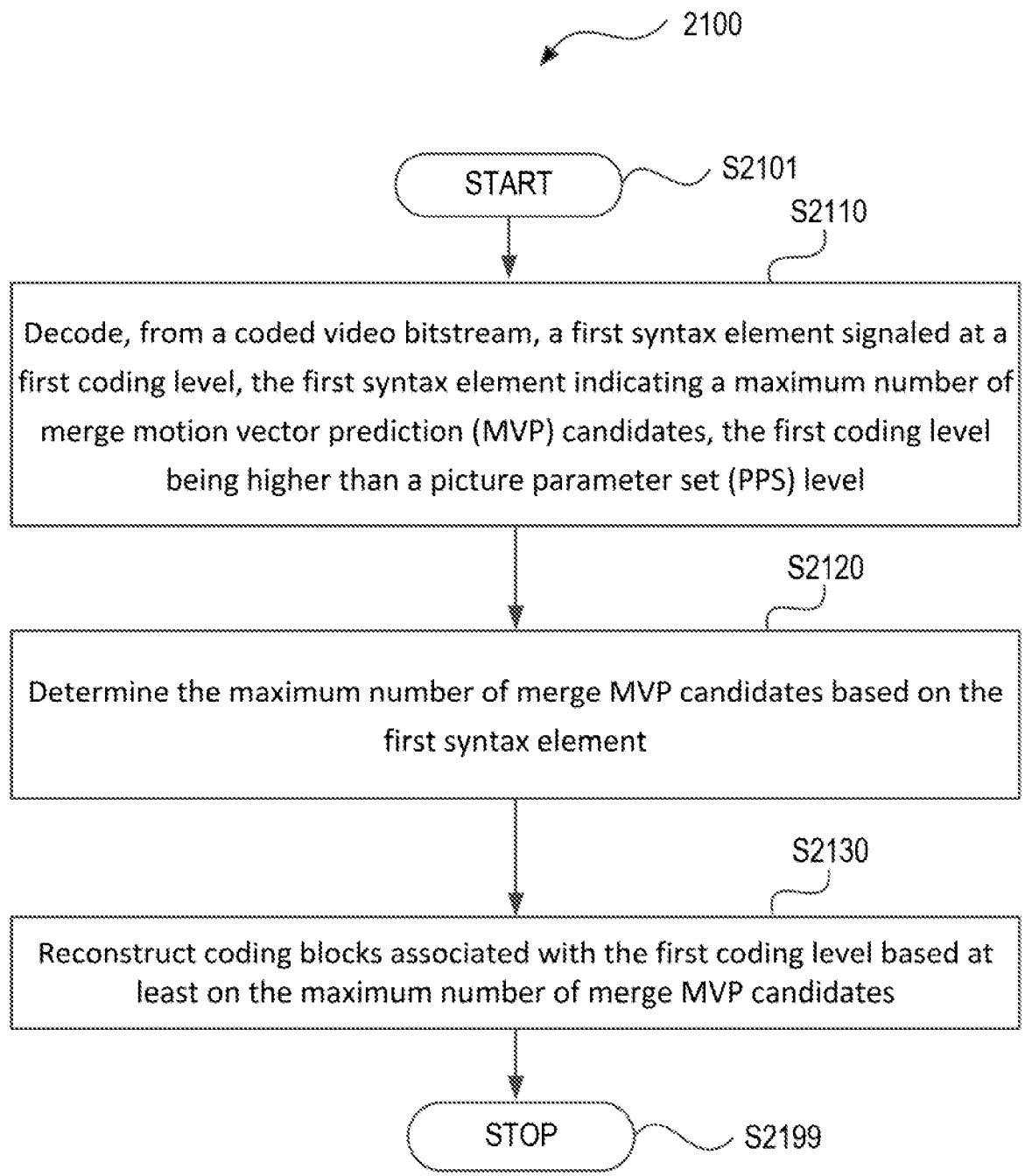
FIG. 21 shows a flow chart outlining a process (2100) according to an embodiment of the disclosure.

FIG. 21 shows a flow chart outlining a process (2100) according to an embodiment of the disclosure. The process (2100) can be used in signaling various syntax elements indicating maximum numbers of merge candidates, such as the maximum number of merge MVP candidates, the maximum number of geometric merge mode merge candidates, the maximum number of subblock-based merge MVP candidates, the maximum number of IBC merge BVP candidates, and/or the like. In various embodiments, the process (2100) is executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (2100) is implemented in software instructions, thus when the processing circuitry executes the software instructions, the processing circuitry performs the process (2100). The process starts at (S2101) and proceeds to (S2110).

At (S2110), the first syntax element signaled at the first coding level can be decoded from a coded video bitstream. The first syntax element can indicate the maximum number of merge motion vector prediction (MVP) candidates. The first coding level can be higher than a picture parameter set (PPS) level. In an example, the first coding level is a sequence level.

At (S2120), the maximum number of merge MVP candidates can be determined based on the first syntax element.

At (S2130), coding blocks associated with the first coding level can be reconstructed based at least on the maximum number of merge MVP candidates. The process (2100) proceeds to (S2199), and terminates.

The process (2100) can be suitably adapted. Step(s) in the process (2100) can be modified and/or omitted. Additional step(s) can be added. Any suitable order of implementation can be used.

In some examples, additional syntax elements, such as one or more of the second syntax element, the third syntax element, and the fourth syntax element can be signaled or conditionally signaled. Accordingly, the maximum number of geometric merge mode merge candidates can be determined based on the second syntax element, the maximum number of subblock-based merge MVP candidates can be determined based on the third syntax element, and the maximum number of IBC merge BVP candidates can be determined based on the fourth syntax element.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. The methods (or embodiments), an encoder, and a decoder in the disclosure can increase coding efficiency and/or reduce a signaling overhead as described above.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
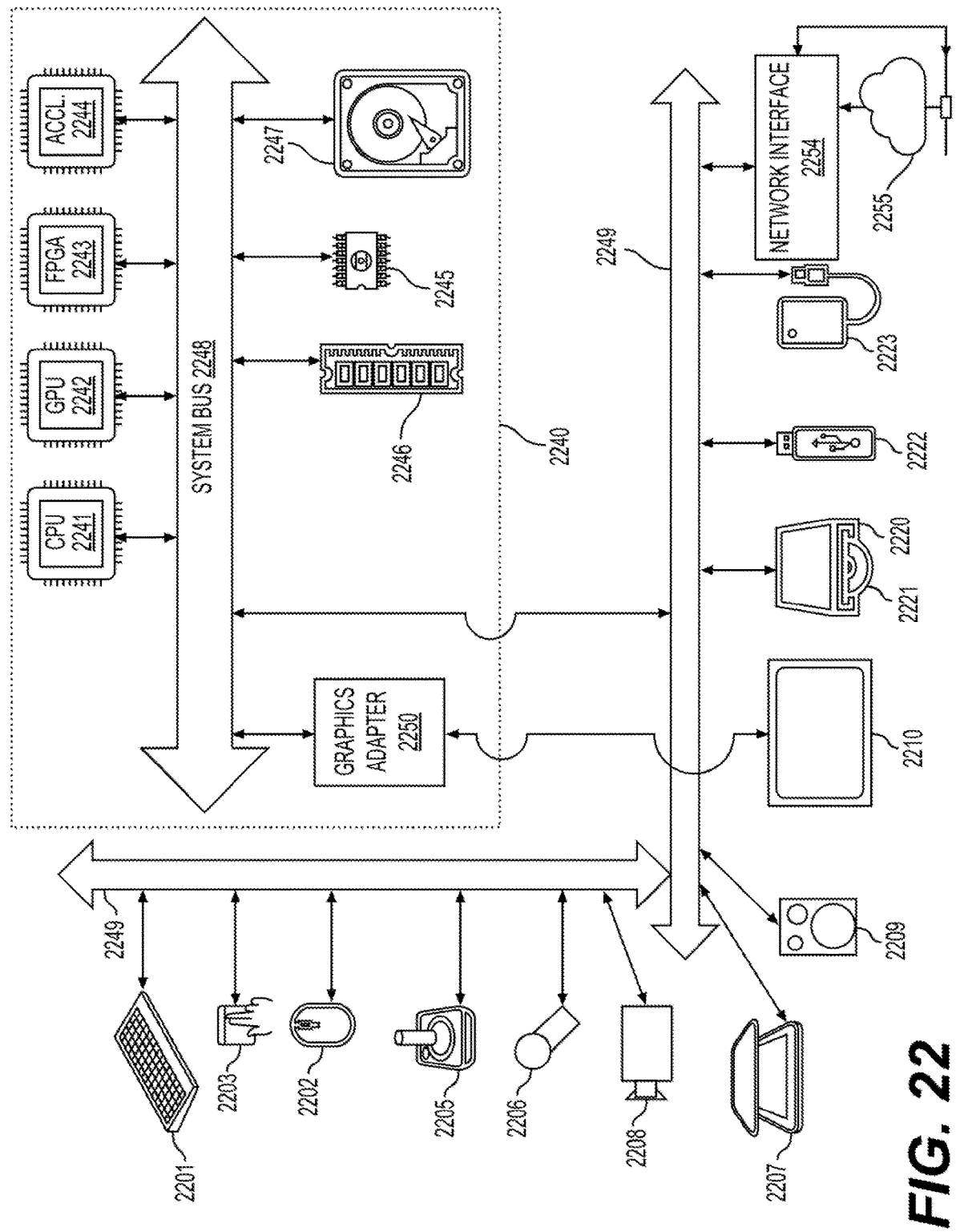
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hard-wired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding, comprising:
generating, by processing circuitry of a video encoder, a set of syntax elements defining maximum numbers of merge candidates for a picture sequence in a coded video bitstream, the set of syntax elements including at least one of a first syntax element indicating a maximum number of merge motion vector prediction (MVP) candidates, a second syntax element indicating a maximum number of geometric merge mode merge candidates, a third syntax element indicating a maximum number of subblock-based merge MVP candidates, and a fourth syntax element indicating a maximum number of intra block copy (IBC) merge block vector prediction (BVP) candidates;
encoding the set of syntax elements defining the maximum numbers of merge candidates in a sequence parameter set (SPS) in the coded video bitstream; and
transmitting the coded video bitstream including the set of syntax elements,
wherein coding blocks of the picture sequence in the coded video bitstream are coded using the maximum numbers of merge candidates indicated by the set of syntax elements.

2. The method of claim 1, further comprising:
including, in the set of syntax elements in the coded video bitstream, the second syntax element, the third syntax element, and the fourth syntax element.

3. The method of claim 1, further comprising:
including, in the coded video bitstream and based on a condition being satisfied, a fifth syntax element at a second coding level, the fifth syntax element indicating a maximum number of merge candidates for one of a geometric merge mode, a subblock-based merge mode, and an intra block copy (IBC) merge mode.

4. The method of claim 3, wherein
the one of the geometric merge mode, the subblock-based merge mode, and the IBC merge mode is the geometric merge mode;
the maximum number of merge candidates is a maximum number of geometric merge mode merge candidates;
the fifth syntax element indicates the maximum number of geometric merge mode merge candidates; and
the condition is the geometric merge mode being enabled at the second coding level and the maximum number of merge MVP candidates being larger than or equal to 3.

5. The method of claim 3, wherein
the one of the geometric merge mode, the subblock-based merge mode, and the IBC merge mode is the subblock-based merge mode;
the maximum number of merge candidates is a maximum number of subblock-based merge MVP candidates;
the fifth syntax element indicates the maximum number of subblock-based merge MVP candidates; and
the condition is an affine mode being enabled at the second coding level.

6. The method of claim 3, wherein
the one of the geometric merge mode, the subblock-based merge mode, and the IBC merge mode is the IBC merge mode;
the maximum number of merge candidates is a maximum number of IBC merge block vector prediction (BVP) candidates;
the fifth syntax element indicates the maximum number of IBC merge BVP candidates; and
the condition is the IBC merge mode being enabled at the second coding level.

7. The method of claim 3, wherein the second coding level is a sequence level.

8. The method of claim 5, wherein the fifth syntax element is modified at a coding level that is lower than the second coding level.

9. The method of claim 8, wherein the second coding level is a sequence level, and the coding level that is lower than the second coding level is a picture level.

10. An apparatus for video decoding, comprising:
processing circuitry configured to
decode, from a coded video bitstream, a sequence parameter set (SPS) including a set of syntax elements defining maximum numbers of merge candidates for a picture sequence in the coded video bitstream, the set of syntax elements including at least one of a first syntax element indicating a maximum number of merge motion vector prediction (MVP) candidates, a second syntax element indicating a maximum number of geometric merge mode merge candidates, a third syntax element indicating a maximum number of subblock-based merge MVP candidates, and a fourth syntax element indicating a maximum number of intra block copy (IBC) merge block vector prediction (BVP) candidates; and
decode coding blocks of the picture sequence in the coded video bitstream using the maximum numbers of merge candidates indicated by the set of syntax elements.

11. The apparatus of claim 10, wherein the processing circuitry is further configured to:
decode, from the set of syntax elements in the coded video bitstream, the second syntax element, the third syntax element, and the fourth syntax element.

12. The apparatus of claim 10, wherein the processing circuitry is further configured to:
decode, from the coded video bitstream and based on a condition being satisfied, a fifth syntax element signaled at a second coding level, the fifth syntax element indicating a maximum number of merge candidates for one of a geometric merge mode, a subblock-based merge mode, and an intra block copy (IBC) merge mode.

13. The apparatus of claim 12, wherein
the one of the geometric merge mode, the subblock-based merge mode, and the IBC merge mode is the geometric merge mode;
the maximum number of merge candidates is a maximum number of geometric merge mode merge candidates;
the fifth syntax element indicates the maximum number of geometric merge mode merge candidates; and
the condition is the geometric merge mode being enabled at the second coding level and the maximum number of merge MVP candidates being larger than or equal to 3.

14. The apparatus of claim 12, wherein
the one of the geometric merge mode, the subblock-based merge mode, and the IBC merge mode is the subblock-based merge mode;
the maximum number of merge candidates is a maximum number of subblock-based merge MVP candidates;
the fifth syntax element indicates the maximum number of subblock-based merge MVP candidates; and
the condition is an affine mode being enabled at the second coding level.

15. The apparatus of claim 12, wherein
the one of the geometric merge mode, the subblock-based merge mode, and the IBC merge mode is the IBC merge mode;
the maximum number of merge candidates is a maximum number of IBC merge block vector prediction (BVP) candidates;
the fifth syntax element indicates the maximum number of IBC merge BVP candidates; and
the condition is the IBC merge mode being enabled at the second coding level.

16. The apparatus of claim 12, wherein the second coding level is a sequence level.

17. The apparatus of claim 14, wherein the fifth syntax element is modified at a coding level that is lower than the second coding level.

18. A method of processing visual media data, the method comprising:
processing a bitstream of the visual media data according to a format rule, wherein
the bitstream includes a set of syntax elements defining maximum numbers of merge candidates for a picture sequence in the bitstream, the set of syntax elements including at least one of a first syntax element indicating a maximum number of merge motion vector prediction (MVP) candidates, a second syntax element indicating a maximum number of geometric merge mode merge candidates, a third syntax element indicating a maximum number of subblock-based merge MVP candidates, and a fourth syntax element indicating a maximum number of intra block copy (IBC) merge block vector prediction (BVP) candidates;
the format rule specifies that
the set of syntax elements defining the maximum numbers of merge candidates is encoded in a sequence parameter set (SPS) in the bitstream;
the bitstream including the set of syntax elements is transmitted; and
coding blocks of the picture sequence in the bitstream are coded using the maximum numbers of merge candidates indicated by the set of syntax elements.

* * * * *